Jan. 12, 1965     D. H. BEISEL     3,165,326
VEHICLE SUSPENSION
Filed Aug. 31, 1961
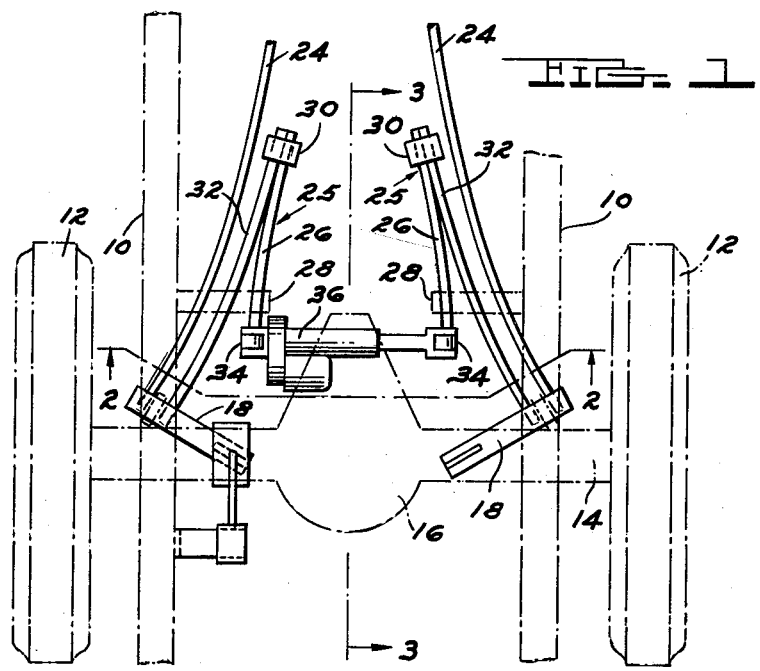
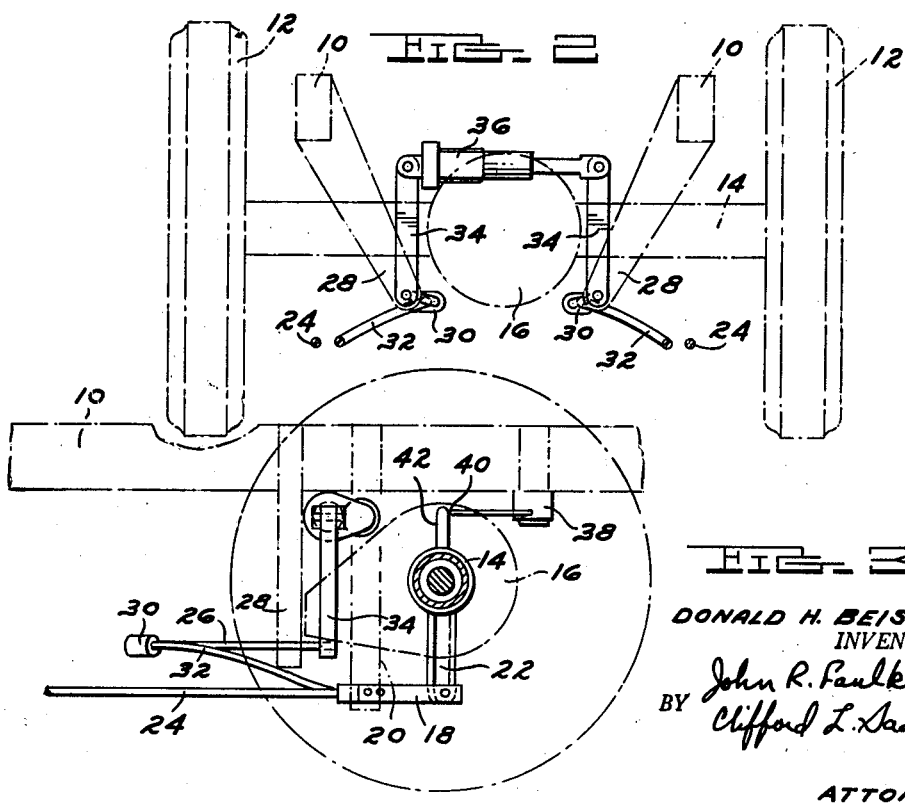
DONALD H. BEISEL
INVENTOR.
BY John R. Faulkner
Clifford L. Sadler
ATTORNEYS

United States Patent Office 3,165,326
Patented Jan. 12, 1965

3,165,326
VEHICLE SUSPENSION
Donald H. Beisel, Royal Oak, Mich., assignor to Ford Motor Company, Dearborn, Mich., a corporation of Delaware
Filed Aug. 31, 1961, Ser. No. 135,336
6 Claims. (Cl. 280—6)

This invention relates generally to motor vehicle suspension systems and more particularly to an automatic load compensator for such systems.

It has been long recognized that mechanical means for leveling a vehicle in response to changes in loading have distinct advantages. When leveling means are provided the vehicle is maintained at its designed ride height. Under such conditions the headlights are always aimed in the proper direction. Even when the vehicle is heavily loaded it will usually not bottom out upon encountering road obstacles. Most important, the riding and handling characteristics of the vehicle do not deteriorate under loads.

In view of the advantages of an automatic leveling mechanism for automotive vehicles, it is the general object of this invention to provide a vehicle suspension having a load compensator system that is of simplified reliable construction and economical to manufacture.

More specifically, it is an object of the present invention to provide a vehicle suspension system with a pair of V-shaped torsion bars each having one of its ends connected to a suspension control arm and the other of its ends journaled in a frame mounted bracket. Lever arms are secured to the torsion bars near their journaled ends. A power actuatable strut is suspended between the free ends of the lever arms. The strut is adapted to rotate the arms in equal but opposite amounts in order to increase or decrease the static loading of the torsion bar springs. The loading of the springs is automatically changed to compensate for changes in the vehicle loading so that the vehicle may be maintained at a constant ride height.

These and other projects of the present invention will be more readily understood from the following discussion and the accompanying drawings, in which:

FIGURE 1 is a top plan view of the rear portion of a motor vehicle chassis incorporating the presently preferred embodiment of this invention;

FIGURE 2 is an elevational view in section taken along section lines 2—2 of FIGURE 1; and, FIGURE 3 is a side elevational view in section taken along section lines 3—3 of FIGURE 1.

Referring now to the drawings for a more detailed understanding of the present invention, FIGURE 1 discloses the rear portion of a motor vehicle chassis having frame structure 10 outlined in phantom. A pair of road wheels 12 are connected at the outer ends of an axle 14 which has a differential gear unit 16 positioned at the midpoint thereof.

The position of the axle 14 relative to the frame 10 is maintained in part by a pair of lower control arms 18 that are pivotally connected at their forward ends to the side rails of the frame 10 by means of bracket structure in a conventional fashion. A portion of the frame mounted pivot bracket for the arm 18 of one side is shown in FIGURE 3 and is indicated by the reference numeral 20. The rearward ends of the control arms 18 are connected to the axle by means of axle brackets 22 that extend downwardly therefrom.

The axle 14 is also controlled by a single upper control arm extending in a longitudinal direction between the axle 14 and frame structure 10. The upper control arm is conventional and for the sake of clarity has been omitted from the drawing.

Main suspension springs 24 of the torsion bar type are connected to the control arms 18 at adjacent to their connection with frame bracket 20. As the wheels 12 move up and down during the operation of the vehicle over an irregular road, the control arms 18 will rotate in response to the jounce and rebound movement and thereby load the torsion bar springs 24. The torsion bars 24 may be connected to the control arms for the front end of the vehicle so that a reaction occurring at one end will be transmitted to the wheels at the other end. By employing a torsion bar spring extending the length of the vehicle very low spring rates may be achieved.

In accordance with the present invention, means are provided to effect leveling of the vehicle in response to load changes. Such means include a pair of auxiliary torsion bars 25 of generally V-shape. Each bar 25 is of composite construction and has a first bar portion 26 that is journaled in a frame mounted bracket 28. The bar 26 extends forwardly from bracket 28 and is secured to a second torsion bar portion 32 by a connecting piece 30. The torsion bar portion 32 extends rearwardly from the piece 30 and is connected to the control arm 18 adjacent to the point where the main suspension spring 12 is affixed.

As stated above, each of the first torsion bar portions 26 is journaled near one end in the bracket 28. The bar thereof extends through the bracket 28 and an upright lever arm 34 is secured to the protruding end. A jack screw assembly 36 is interposed between the upper ends of the pair of upright lever arms 34. The jack screw assembly 36 contains an electric motor which may be actuated to extend or retract its length. Because the torsion bars 26 are journaled at the bracket 28, the jack screw 36 interconnecting the upstanding lever arms 34 is in effect a floating power strut.

When the assembly 36 is energized the lever arms 34 are rotated in opposite directions about the journal at the lower end of the bracket 28, that is, they are rotated towards each other or away from each other as needed to return the vehicle to a level attitude. When the arms 34 are rotated the static torsional load in the bars 25 is changed and because each of the bars 25 is anchored at a control arm 18 the increase or decrease in torque compensates for vehicle load changes in order to return it to its design ride height.

Automatic control means are provided to actuate the jack screw assembly 36 to perform a leveling action. An electric switch device 38 is mounted upon the frame 10 and has an arm 40 which extends to engage a projection 42 from the axle 14. This connection senses any change in relative position between the frame mounted switch 48 and the unsprung axle 14. Appropriate time delay devices are incorporated in the switch 38 so that it will not sense ordinary jounce and rebound wheel deflections, however, an extended deflection caused by a change in vehicle loading will cause an appropriate signal to be transmitted to the jack screw assembly 36. This signal will energize the electric motor of the jack screw 36 which in turn will cause the lever arms 34 to be rotated to impart a greater torque to the torsion bars 26 if it is desired to increase the height between the chassis and the wheels or in the alternative, to reduce the torque in the torsion bars 25 to decrease the distance to compensate for a lessening in vehicle load.

The leveling mechanism of the present invention is retained solely by the bracket 28 and the connection of the torsion bar portion 32 with the control arms 18. With the jack screw 36 freely suspended between the lever arms 34 a simplified construction is provided that distributes torque equally between the pair of torsion bar assemblies 26.

In addition, the pair of torsion bars 25 are in effect interconnected so that jounce and rebound loadings peculiar to one bar will be transmitted through the jack screw 36 to the other bar.

The foregoing detailed description presents an illustrative example that constitutes the presently preferred embodiment of this invention. The invention is equally applicable to independent suspension systems as well as suspensions for solid axles. The suspension construction may be used in association with main suspension springs or modified to constitute the sole source for resilient support of the sprung suspension components.

Modifications and alterations of this invention may occur to those skilled in the art which would come within the scope and spirit of the following claims.

I claim:

1. A suspension system having sprung and unsprung components, a pair of torsion springs interconnecting said components, said torsion springs each having a portion near one of its ends rotatably mounted on said sprung components, lever arms connected to said ends, a linearly extendable strut freely suspended between and connected to said lever arms and said strut being actuatable to rotate said lever arms in opposite directions.

2. A suspension system having sprung and unsprung components, a pair of torsion bars interconnecting said components, said torsion bars each having a portion near one of its ends journaled in sprung bracket means, lever arms connected to said ends, a linearly extendable strut freely suspended between and connected to said lever arms and said strut being actuatable to rotate said lever arms in opposite directions.

3. A vehicle suspension system having sprung and unsprung components, a pair of control arms interconnecting said components, a pair of torsion springs each connected to one of said control arms at one of their ends and rotatably supported in said sprung components near the other of their ends, lever arms connected to said other ends, a linearly extendable means freely suspended between and connected to said lever arms and said extendable means being constructed to rotate said arms in equal and opposite directions.

4. A vehicle suspension system having sprung and unsprung components, control arms interconnecting said components, a pair of V-shaped torsion bars connected to said control arms at one of their ends and sprung mounted bracket means rotatably supporting portions of said bars near the other of their ends, lever arms connected to said other ends, a linearly extendable device freely suspended between and connected to said lever arms and said extendable device being constructed to rotate said lever arms in equal and opposite directions.

5. A vehicle suspension having a chassis frame, a transversely extending axle housing, a road wheel rotatably mounted at each end of said axle housing, a pair of suspension arms interconnecting said axle housing and said chassis frame, a first V-shaped torsion bar spring having one end secured to one of said arms, said first spring being journaled in a frame bracket near its other end, a second V-shaped torsion bar spring having one end secured to the other of said arms, said second spring being journalled in a frame bracket near its other end, a lever arm secured to and extending upwardly from each of the said other ends of both the first spring and the second spring, an extendable power strut having one end pivotally connected to the upper end of one of said lever arms and another end pivotally connected to the upper end of the other lever arm whereby said power strut is freely suspended and not otherwise supported, said power strut being extendable to cause said lever arms to rotate the said other ends of said first and second torsion springs in opposite directions whereby a spring load is imposed between said chassis frame and said axle housing.

6. A vehicle suspension having a chassis frame, a transversely extending axle housing, a road wheel rotatably mounted at each end of said axle housing, a pair of suspension arms interconnecting said axle housing and said chassis frame, a first torsion bar spring having one end secured to one of said arms, said first spring being journalled in a frame bracket near its other end, a second torsion bar spring having one end secured to the other of said arms, said second spring being journalled in a frame bracket near its other end, a lever arm secured to and extending upwardly from each of the said other ends of both the first spring and the second spring, an extendable power strut having one end pivotally connected to the upper end of one of said lever arms and another end pivotally connected to the upper end of the other lever arm whereby said power strut is freely suspended and not otherwise supported, said power strut being extendable to cause said lever arms to rotate the said other ends of said first and second torsion springs in opposite directions whereby a spring load is imposed between said chassis frame and said axle housing.

References Cited in the file of this patent

UNITED STATES PATENTS

| 2,387,249 | Eddington | Oct. 23, 1945 |
| 2,755,875 | Muller | July 24, 1956 |
| 2,757,938 | Crowder | Aug. 7, 1956 |
| 2,825,576 | Allison | Mar. 4, 1958 |